(12) United States Patent
Fan

(10) Patent No.: US 6,807,342 B2
(45) Date of Patent: Oct. 19, 2004

(54) FIBER OPTIC TUNABLE FILTER USING A FABRY-PEROT RESONATOR

(75) Inventor: Robert Fan, Canoga Park, CA (US)

(73) Assignee: OpticNet, Inc., Hayward, CA (US)

( * ) Notice: Subject to any disclaimer, the term of this patent is extended or adjusted under 35 U.S.C. 154(b) by 215 days.

(21) Appl. No.: 10/096,541

(22) Filed: Mar. 12, 2002

(65) Prior Publication Data

US 2003/0174952 A1 Sep. 18, 2003

(51) Int. Cl.[7] .................................................. G02B 6/26
(52) U.S. Cl. ............................ 385/39; 385/11; 385/12; 385/7; 385/39; 372/49
(58) Field of Search ................................. 385/39, 7, 11, 385/12; 372/49

(56) References Cited

U.S. PATENT DOCUMENTS 6,438,150 B1 * 8/2002 Yoo ............................. 372/49

* cited by examiner

Primary Examiner—Hemang Sanghavi
Assistant Examiner—Eric Wong
(74) Attorney, Agent, or Firm—Coudert Brothers LLP

(57) ABSTRACT

A tunable filter with a flattopped passband is provided for use as a micromachined optical filter with input and output optical fibers which provides a wavelength tunability with several discrete wavelengths and a flattopped passband. The standard Fabry-Perot resonator is modified by incorporating multilayer dielectrics to form a pair of interference filters, one of which is vibrated to provide for tunability and provision of several resonant wavelengths. The layers can either be deposited on an existing dielectric slab of a Fabry-Perot device or included on the ends of the input and output optical fibers which are then incorporated into the Fabry-Perot device.

8 Claims, 3 Drawing Sheets

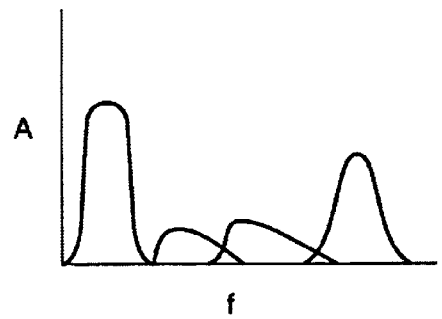
FIG._1 (PRIOR ART)
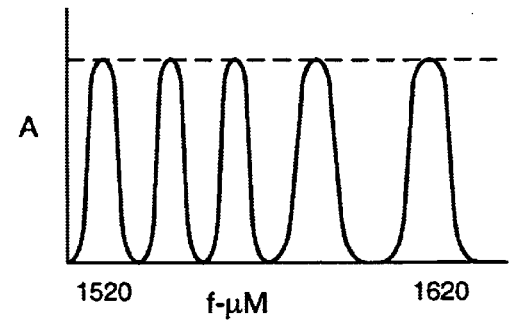
FIG._3
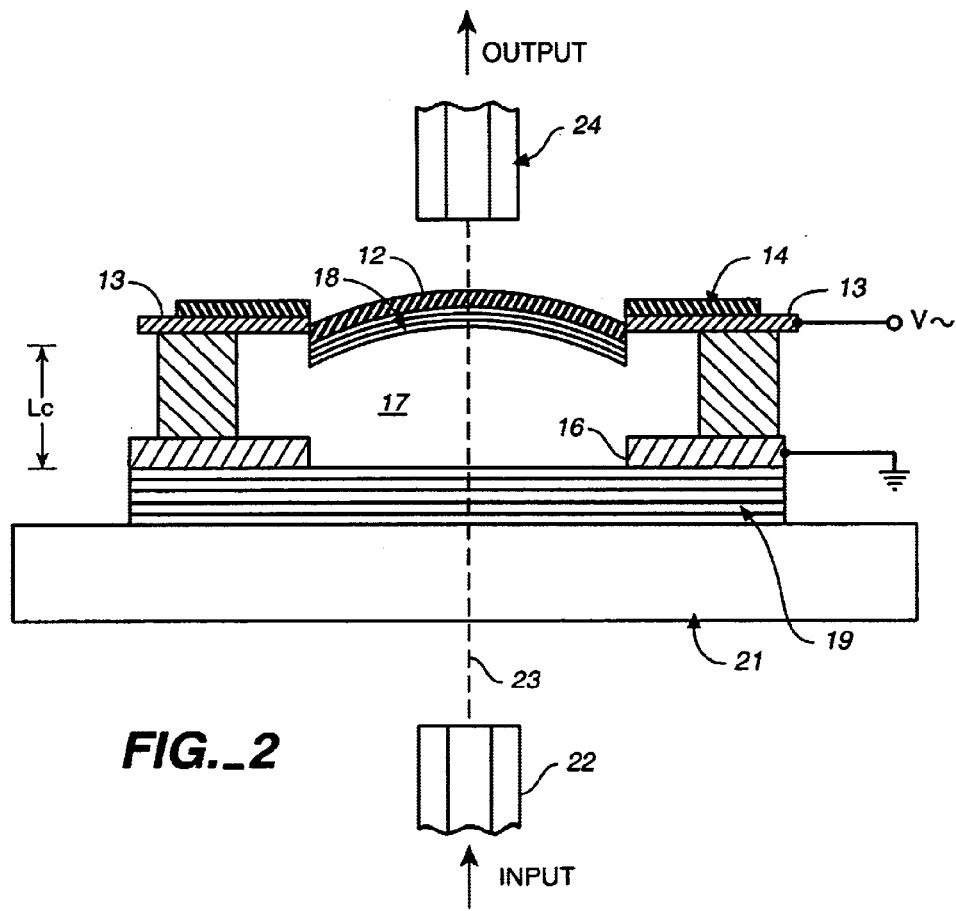
FIG._2

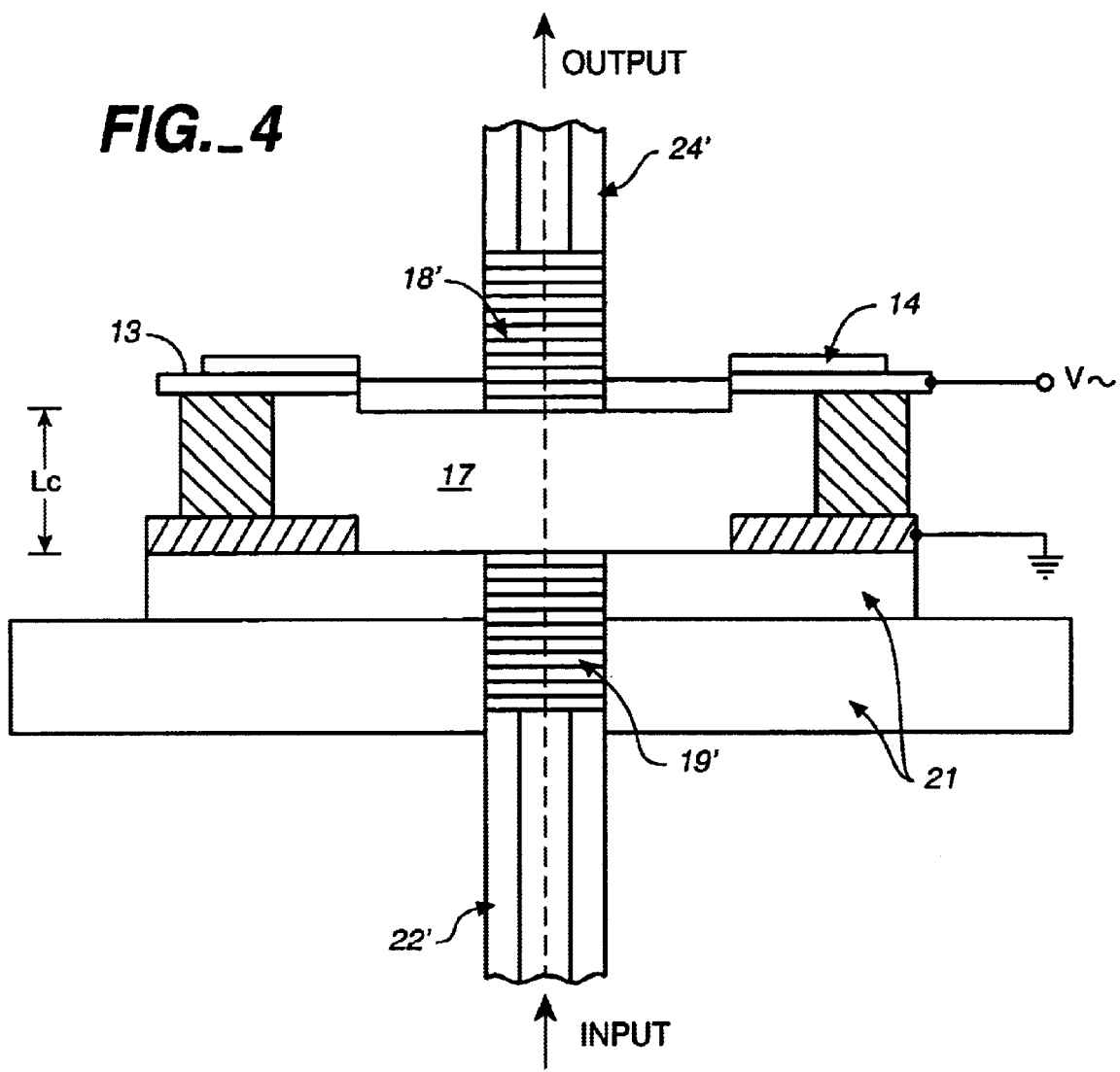
FIG._4
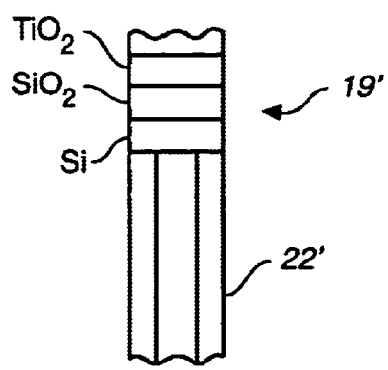
FIG._5
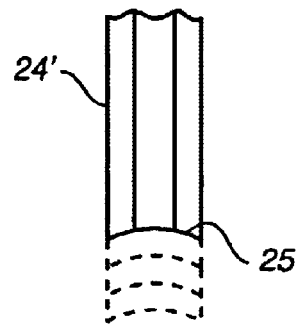
FIG._6

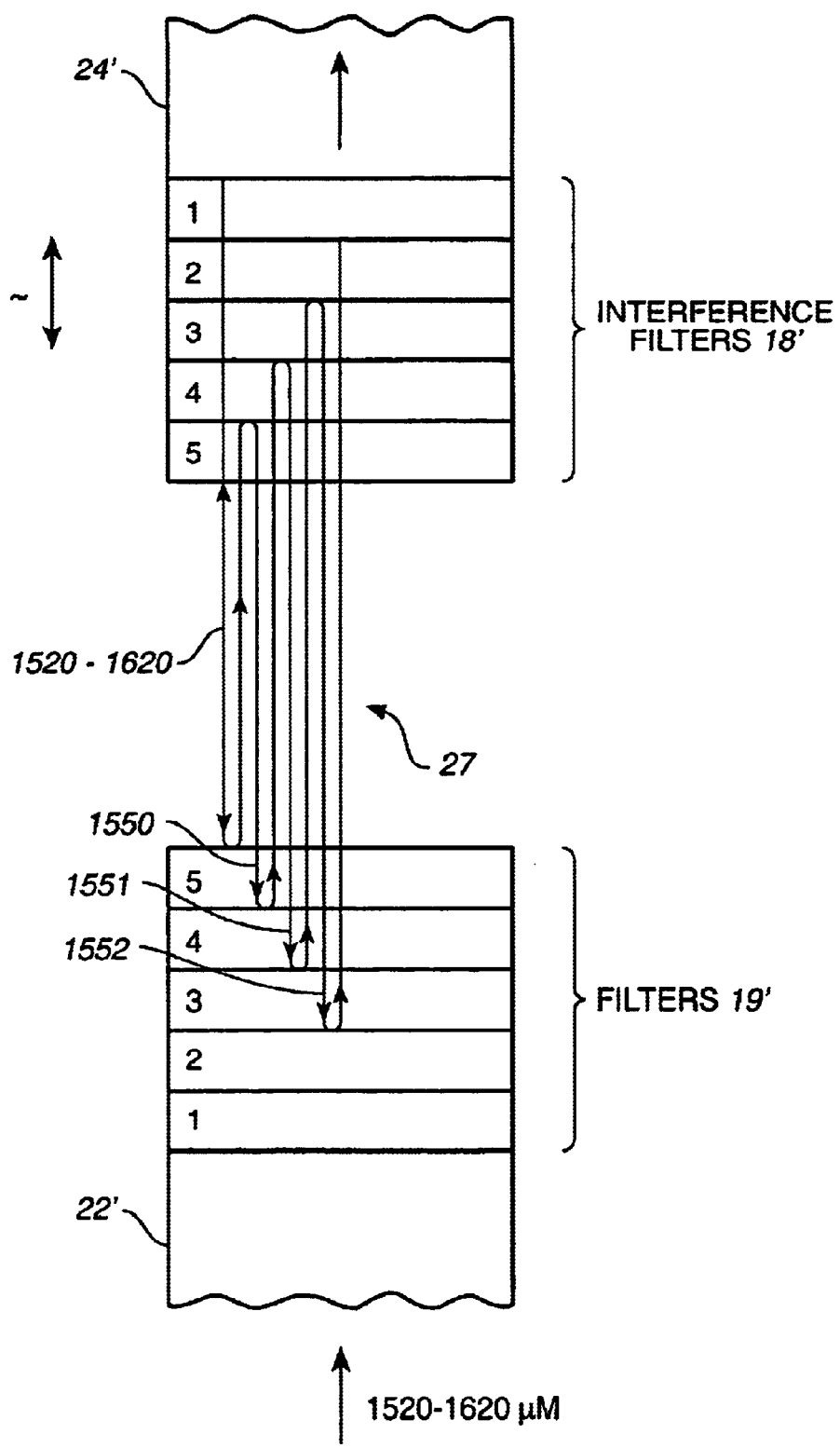
FIG._7

250
FIBER OPTIC TUNABLE FILTER USING A FABRY-PEROT RESONATOR

INTRODUCTION

The present invention is directed to a fiber optic tunable filter using a Fabry-Perot resonator and more specifically to a filter having a flattopped passband.

BACKGROUND OF THE INVENTION

In recent years, much attention has been paid to the development of a tunable optical filter based on a Fabry-Perot resonator. Two types of Fabry-Perot filters have been investigated. One type is a non-tunable filter where the mirror spacing is fixed and is equal to the layer thickness (that is the mirror layers over the dielectric) deposited during fabrication. In a tunable filter one of the mirrors is movable, resulting in adjustable mirror spacing. The foregoing, however, do not simultaneously satisfy the two important requirements of a wavelength-division multiplexing (WDM) filter; that is, wavelength tunability and a flattopped passband.

In a regular Fabry-Perot resonator or etalon (where the etalon is a slab of dielectric material of a certain index of refraction and thickness) the bandwidth of each transmission peak can be narrow and only one wavelength is transmitted with maximum transmission. If a regular Fabry-Perot etalon is made into a tunable filter, this is done by selecting the index of refraction of the medium in the cavity to select a specific resonant wavelength. The wavelength in resonance with the optical length of the cavity is transmitted, whereas the other wavelengths are reflected. Thus, a tunable Fabry-Perot filter where, for example, only one reflective mirror is used and this mirror is vibrated at a frequency of one to three kHz might produce with a complex frequency input a output such as shown in FIG. 1 where there are two wavelength peaks at different amplitudes and other wavelengths much lower in amplitude and overlapping. As discussed above, this is eminently unsuitable for WDM.

OBJECT AND SUMMARY OF THE INVENTION

It is a general object of the present invention to provide improved fiber optic tunable filter.

In accordance with the above object there is provided a fiber optic tunable filter using a Fabry-Perot resonator comprising a pair of opposed interference filters each having three or more layers and spaced apart around a Fabry-Perot cavity a distance substantially equal to an integral number of wavelengths of the cavity's resonant frequency. Input and output optical fibers are coupled to the cavity via the interference filters respectively, the input fiber transmitting an incident light beam having a plurality of nondistinct wavelengths near the resonant wavelength. Means are provided for vibrating one of the interference filters in the direction of the light beam whereby a plurality of distinct wavelengths of substantially equal amplitude is produced on the output fiber.

BRIEF DESCRIPTION OF THE DRAWINGS

FIG. 1 is a spectral output characteristic illustrating a tunable Fabry-Perot filter of the prior art type;

FIG. 2 is a cross sectional view of a filter embodying the present invention;

FIG. 3 is a spectral output characteristic of a filter such as in FIG. 2;

FIG. 4 is a cross sectional view of an alternative embodiment of the invention similar to FIG. 2 but with integrated optical fibers in the Fabry-Perot etalon;

FIG. 5 is an enlarged portion of an optical fiber of FIG. 4;

FIG. 6 is an alternative embodiment of an optical fiber of FIG. 4, specifically the output fiber;

FIG. 7 is a diagrammatic enlargement of the input and output optical fibers in FIG. 4 illustrating the method of the present invention.

DETAILED DESCRIPTION OF PREFERRED EMBODIMENTS

FIG. 2 illustrates a Fabry-Perot device which, however, is modified in accordance with the present invention. There is a dielectric slab 12 of a silicon nitride type material which is suspended on an aluminum shelf 13 also having the nitride overlay 14 which is fabricated with the nitride slab 12. A grounded conductive disk 16 provides an input aperture into the cavity 17 which has a length Lc which in well-known Fabry-Perot theory determines the resonant frequency or wavelength of the Fabry-Perot device.

Fabricated on the dielectric slab 12 are multiple layers 18 of semiconductive material and multiple layer 19 which are sandwiched between the silicon base 21 and disk 16. Such layers may be fabricated by photorefraction or photoinscription and form multiple interference filters. As is well-known, an interference filter consists of multiple thin layers of dielectric material having different refractive indices. The interference filters are wavelength selective by virtue of the interference effects that take place between the incident and reflected waves at the thin-film boundaries. Suitable materials for such dielectric stacks are gallium arsenide and aluminum arsenide (GaAs and AlAs), also aluminum oxide and gallium arsenide (AlOx and GaAs); and finally the silicon and silicon dioxide (Si and $SiO_2$) and silicon dioxide and titanium dioxide ($SiO_2$ and $TiO_2$) stacked mirrors. These interference filters effectively form, when dimensioned properly, quarter wave stacked mirrors. The above materials are not limited to the foregoing but may also include ZnSe, CdTe, ZnTe, Cds, SiC, GanAl-nAs. When a complex wavelength input, for example of the infrared type, is inputted by the optical fiber 22 along the axis 23, the silicon slab 21 and the dielectric slab 19 will freely transmit such infrared wavelengths. Because of the multiple layers of 18 and 19 causing repeated reflections and retransmissions (that is, they are acting as interference filters) the light output on output fiber 24 will have a characteristic essentially as shown in FIG. 3 where there are discrete wavelengths (this assumes a mixed input from 1520 to 1620 micrometers) and the output peaks will also be of uniform amplitude (that is, the resonant wavelengths may cover a band with a uniform response). This is further accomplished by the application of an oscillating voltage V to the aluminum shelf 13. Such vibration of one of the interference filters in the direction of the light beam will produce, as illustrated in FIG. 3, the equal amplitudes. Thus, the oscillation vertically upwards and downwards provides incremental length variations for tuning and such movement provides resonance. Thus, the interference filters which act as mirrors are different from normal mirrors since they cause an additional phase shift of the reflected beam owing to the combined effects of all of the multiple interference filters. For an incident beam with different wavelengths, the phase shift on reflection is different. An additional phase shift depends on the characteristics of the multiple interference filters.

The device of FIG. 2 which modifies a standard Fabry-Perot resonator by specifically layering the interference filters on an existing dielectric slab 12 which normally has mirrored surfaces, may be difficult to manufacture and align. Thus, the variation of FIG. 4 illustrates a Fabry-Perot device with the cavity 17, but the optical fibers 22[1] and 24[1] have interference filters 18[1] and 19[1] fixed or layered on each end surface of the input and output fibers. FIG. 5 illustrates for fiber 22[1], a typical interference filter 19[1] which may be composed of the indicated trio of the materials indicated above including silicon, silicon dioxide and titanium dioxide. Then, FIG. 6 illustrates fiber 24[1] which besides the multiple layers coating the end of the fiber may be curved in a concave shape indicated at 25 to provide greater energy concentration. Again, the aluminum shelf 13 is driven by an oscillating voltage V. However, the mirrored ends of the fibers 18[1] and 19[1] are an integral part of both the nitride overlay (upper layer) 14 and the silicon base (lower layer) 21.

FIG. 7 illustrates the operation of the device in FIG. 4 (as well as the device in FIG. 2) showing how the interference filters act as mirrors and how multiple interference paths indicated at 27 pass through the various interference filters, some being reflected and some being transmitted. Typical wavelengths are shown. With an input of 1520 to 1620 micrometers at the filters 19[1] various distinct wavelengths, for example, 1550, 1551 and 1552 maybe provided. Of course, at least one of the interference filters is oscillated for better performance.

Since each distinct wavelength is formed by a pair of interference filters, it is believed that a minimum number of layers to form a suitable device is three layers.

From the theoretical standpoint, the equations below illustrate the operation of the device. Equation 1 illustrates a standard Fabry-Perot resonator (etalon) where the resonant frequency is defined and proportional to the effective cavity length Lc. Thus, the equation illustrates that indeed the resonant wavelength of a Fabry-Perot etalon is proportional to the cavity length. Equation 2 illustrates the functioning of the interference filters which function only when a so-called Bragg condition is satisfied. Equation 2 illustrates the Bragg wavelength is proportional to the interference filter period. Thus, if we wish the Bragg wavelength to be one of the resonant wavelengths of the Fabry-Perot cavity, the interference filter period should satisfy equation 3. From this equation it can be seen that for a Fabry-Perot etalon with interference filter mirrors, the effective cavity length is proportional to the interference filter period.

For the filter to be insensitive to wavelength jitter and wavelength registration, the ideal transmission spectrum of the filter should have a passband near each of the nominal channel wavelengths to provide a uniform response. To make the Fabry-Perot etalon resonate at more than one wavelength, it is necessary to use multiple-reflection interference filters each with a different interference filter period. These will serve as the effective dielectric mirrors of the Fabry-Perot etalon. Each of the resonant wavelengths results from a pair of interference filters with a specific interference filter period. After the interference filter period for each pair of interference filters has been carefully selected, the combination of all resonant wavelengths can widen the top of the transmission peak of the Fabry-Perot etalon; that is, it is possible to have a resonant wavelength cover an entire band with uniform response as, for example, illustrated by the output in FIG. 3.

Thus, an improved fiber optic tunable filter has been provided.

Equations $$um = mc/2\pi nLc \quad (1)$$

$$\lambda B = 2n\Lambda \quad (2)$$

$$\Lambda = \pi Lc/m \quad (3)$$

where,
 um=frequency of the mth longitudinal mode
 m=an integer
 c=speed of light in a vacuum
 n=index of refraction of medium in cavity
 Lc=effective cavity length
 λB=Bragg wavelength
 Λ=interference filter period

What is claimed is:

1. A fiber optic tunable filter using a Fabry-Perot resonator comprising:
   a pair of opposed interference filters each having three or more layers and spaced apart around a Fabry-Perot cavity a distance substantially equal to an integral number of wavelengths of said cavity resonant frequency;
   input and output optical fibers coupled to said cavity via said interference filters respectively, said input fiber transmitting an incident light beam having a plurality of non-distinct wavelengths near said resonant wavelength; and
   means for vibrating one of said interference filters in the direction of said light beam whereby a plurality of distinct wavelengths of substantially equal amplitude is produced on said output fiber.

2. A filter as in claim 1 where said interference filters are fixed on each end surface of said input and output fibers.

3. A filter as in claim 1 where said interference filters are an integral part of said Fabry-Perot cavity and are separate from said optical fibers.

4. A filter as in claim 1 where the effective resonant length of said cavity is substantially proportional to the periods of the interference filters.

5. A filter as in claim 1 where each distinct wavelength is formed by a pair of interference filters.

6. A filter as in claim 1 where the passband of each interference filter is near the resonant wavelength of said cavity and near each distinct wavelength.

7. A filter as in claim 1 where the Fabry-Perot resonant wavelength is proportional to the refractive index of the medium of the cavity and the cavity length, the interference filters have a period equal to the Bragg wavelength and the resultant necessary condition for the Bragg wavelength to equal the resonant wavelength of the cavity is pi times cavity length times the ratio of an integer, m, and c, the speed of light in a vacuum, each pair of interference filters providing a specific interference filter period whereby the resonant wavelengths cover a band with uniform response.

8. A filter as in claim 1 where said means for vibrating provides incremental length variations for tuning.

\* \* \* \* \*